United States Patent [19]

Wieland et al.

[11] Patent Number: 4,590,656
[45] Date of Patent: May 27, 1986

[54] TUBE EXPANDER AND FREEZER AND METHOD OF USING SAME

[75] Inventors: Rolf H. Wieland, Norristown; Howard D. Brodbeck, Berwyn; Alan J. Paston, Dresher, all of Pa.; Casper C. Maucere, Randolph, N.J.

[73] Assignee: MG Industries, Valley Forge, Pa.

[21] Appl. No.: 737,240

[22] Filed: May 23, 1985

[51] Int. Cl.⁴ .................. B23P 11/02; B23P 19/02; B23P 19/04
[52] U.S. Cl. ........................ 29/450; 29/234; 29/235
[58] Field of Search ............... 29/450, 235, 234, 451

[56] References Cited

U.S. PATENT DOCUMENTS

| | | | |
|---|---|---|---|
| 1,913,198 | 6/1933 | Geyer | 29/451 X |
| 2,506,069 | 5/1950 | Dalton | 29/451 X |
| 4,029,895 | 6/1977 | Scarborough | 29/450 X |
| 4,417,394 | 11/1983 | Moody et al. | 29/450 X |
| 4,506,430 | 3/1985 | Guzay, Jr. | 29/235 X |

Primary Examiner—Charlie T. Moon
Attorney, Agent, or Firm—John F. A. Earley; John F. A. Earley, III

[57] ABSTRACT

A method and apparatus for expanding a length of flexible tubing so it can be placed over a cylindrically shaped member which has an outside diameter larger than the inside diameter of the tubing. This is accomplished by first expanding the flexible tubing mechanically with a flexible cage and mandrel to the desired inside diameter and then freezing it at this expanded size by spraying it with a cooling media such as liquid nitrogen. The frozen expanded tube can then be easily placed over the cylindrically shaped member so that when the expanded tubing warms and returns to its original configuration, it will generate a tight pressure bond to the inserted member.

12 Claims, 4 Drawing Figures

TUBE EXPANDER AND FREEZER AND METHOD OF USING SAME

BACKGROUND OF THE INVENTION

This invention relates to a method and apparatus for assembling and securing a length of flexible tubing having a predetermined internal diameter to a cylindrical member having an external diameter larger than the predetermined internal diameter of the tubing. More particularly, it relates to a method and apparatus for securing a length of flexible tubing such as a plastic or elastomer sleeve to a cylindrical part, such for example as an assembly of a spray can, wherein the outside diameter of the cylindrically shaped member is larger than the internal diameter of the sleeve. This is first accomplished by first expanding the flexible tubing mechanically to the desired interior diameter and then freezing it at this expanded size by spraying it with a cooling media such as liquid nitrogen or equivalent. The flexible tubing then is easily placed over the cylindrically shaped member and when the expanded frozen tubing warms and returns to its original configuration, it generates a tight pressure bond to the inserted cylindrical part without the use of solvents or adhesives.

While the prior art has disclosed various ways for solventless assembly of a flexible tubing to a component they have left something to be desired. Such prior art systems have in general used jaws which are inserted into the tubing and then move apart to create a stretching of the tubing. This is caused by the jaws opening in a non-parallel type movement thus creating a greater stretching of the tubing at the mouth of the jaws then at the inner end. This problem is created because the jaws can only be supported at one end. One attempt to overcome this problem in the prior art has been to use a relatively elaborate guiding arrangement to radially direct the jaw members from a closed position to a position spaced therefrom while maintaining a parallel relationship with respect to the jaw members. Moreover, it is limited as to the length of tubing that can be stretched and the shape of the stretched tubing does not correspond to the part to be inserted therein.

The disadvantages of the prior art are overcome by the present invention which provides for securing a length of flexible tubing having a predetermined internal diameter to a member having an external diameter larger than the predetermined internal diameter of the tubing in an efficient and relatively inexpensive manner.

SUMMARY OF THE INVENTION

In accordance with the present invention the disadvantages of the prior art arrangements have been overcome by eliminating the need for any jaw members and the elaborate arrangements for radially directing the jaw members from a closed position to a position spaced therefrom while maintaining a parallel relationship with respect to the jaw members.

In accordance with the present invention there is provided a method and apparatus for securing a length of flexible tubing having a predetermined internal diameter to a member having an external diameter larger than the predetermined internal diameter of the tubing.

The invention makes use of a flexible cage having a longitudinal portion dimensioned to fit within the length of flexible tubing and means insertable into the longitudinal portion to expand the external diameter of the longitudinal portion to a diameter greater than the predetermined internal diameter of the flexible tubing. Relative movement is produced between the insertable means and the flexible cage to expand the longitudinal portion and the length of flexible tubing thereon to an expanded state so that the internal diameter of the length of flexible tubing is greater than the external diameter of the member to which the length of flexible tubing is to be secured. A cooling media is applied to the length of flexible tubing at a temperature adequate to temporarily freeze the length of flexible tubing in an expanded state while positioned on the flexible cage. The insertable means is then withdrawn from the flexible cage thereby permitting the flexible cage to return to its unexpanded condition and the expanded length of flexible tubing is removed therefrom. The member to which the length of flexible tubing is to be secured is then inserted into the expanded length of flexible tubing so that when the expanded and frozen length of flexible tubing returns to normal temperature and to its original configuration, the length of flexible tubing generates a tight pressure bond to the inserted member. The flexible cage preferably comprises a plurality of wire-like members distributed around a longitudinal axis and connected together at one of their ends along the axis, the opposite ends of the wire-like members being attached to a base around the circumference of an opening therethrough, the opening having its center on the longitudinal axis and having a diameter greater than the maximum diameter of the insertable means.

The insertable means preferably comprises a mandrel adapted to be received within the flexible cage through the opening in the base and along the longitudinal axis, the mandrel being shaped to expand the longitudinal portion of the flexible cage comprising the plurality of wire-like members to the desired configuration. In a preferred form of the invention the mandrel and the flexible cage are disposed within the chamber of a housing. The housing is provided with an opening on the longitudinal axis and the flexible cage is movable into and out of the chamber through the opening along the longitudinal axis to move the length of flexible tubing into the chamber for expansion by the mandrel.

The opening in the housing is adapted to be covered while the cooling media is being applied to the length of flexible tubing in the expanded state. The mandrel preferably is hollow and has a plurality of perforations in the side wall thereof so that the cooling media is directed into the mandrel and out through the perforations and into the space between the interior surface of the expanded length of flexible tubing and the exterior surface of the mandrel. The housing is also preferably provided with means for exhausting the cooling media from the chamber in the housing and with means connected to the chamber of the housing for a cooling media purge of the chamber.

Other features and advantages of the invention and a more complete understanding of the invention will become apparent from the following detailed description, taken in conjunction with the accompanying drawings which form a part of this application.

DETAILED DESCRIPTION OF THE PREFERRED EMBODIMENT

Figure 1:
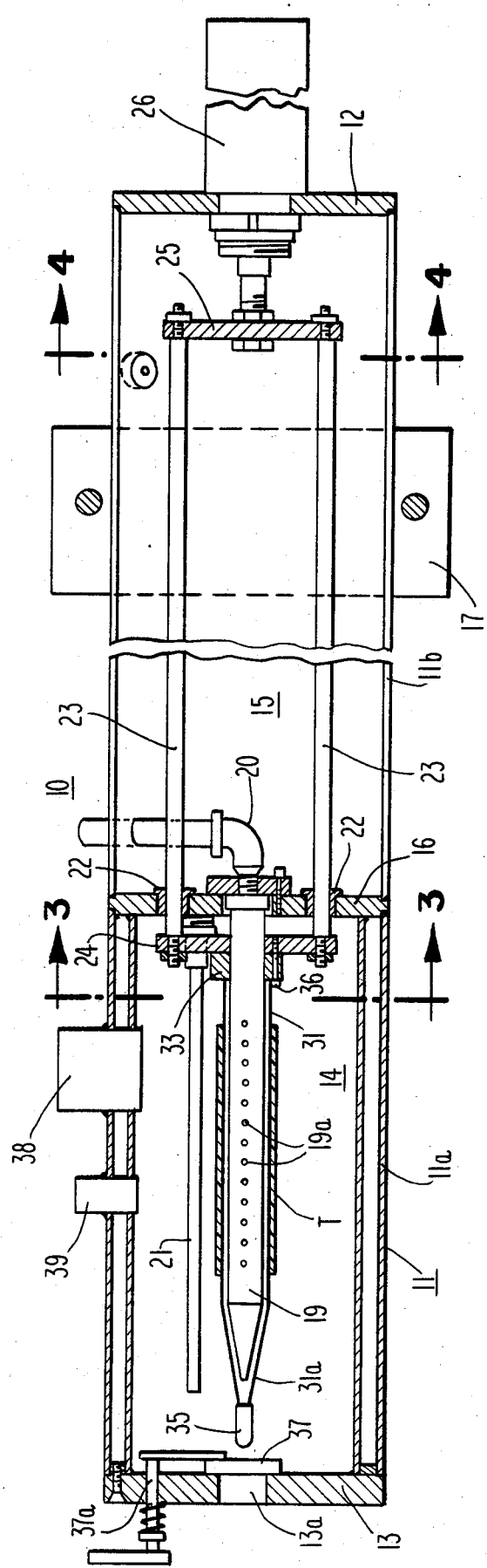
FIG. 1 is a cross-sectional view of an apparatus embodying the present invention.

Referring to FIG. 1 there is illustrated a tube expander and freezer appartus embodying the present invention. The apparatus 10 includes a tubular housing 11 having end plates 12 and 13 and divided into two chambers 14 and 15 by means of a partition 16. The housing 11 comprises a forward section 11a and a rear section 11b. The rear section 11b is formed from a tube split lengthwise and the complete housing 11 is adapted to be supported in a stationary position by a suitable clamp assembly 17. The forward section 11a of the housing containing chamber 14 is provided with a double walled construction as it is adapted to receive a cooling media. The partition 16 supports an expansion mandrel 19 within the chamber 14 and along its longitudinal axis. The mandrel 19 is of hollow construction having a plurality of openings 19a in the side wall. The forward end of the mandrel 19 is open and is adapted for connection by a fitting 20 to a source of cooling media or cryogenic fluid such as liquid nitrogen or other equivalent cooling media. A tubular lance 21 is also supported by the partition 16 and is adapted for connection to the source of cooling media.

The partition 16 is also provided with a pair of bushings 22, 22 through which rods 23, 23 extend. The forward ends of the rods 23, 23 are connected together by a rectangular plate 24, FIG. 3, and the rear ends of the rods 23, 23 are connected together by a rectangular plate 25, FIG. 4. The rear plate 25 is connected to a pneumatically operated double acting cylinder 26 the purpose of which will hereinafter be described.

The forward end plate 24 is adapted to support a flexible cage 30 which in turn carries the length of flexible tubing during the expansion operation by the mandrel 19. As may be seen in FIG. 2 the flexible cage 30 has a longitudinal portion dimensioned to fit within and longer than the length of flexible tubing T. The flexible cage 30 has been illustrated in FIG. 2 in unexpanded state. The flexible cage 30 comprises a plurality of wire-like members 31 preferably made from music wire or equivalent material and having a diameter sufficiently small so that they are readily flexible. The wire-like members 31 are distributed around a longitudinal axis and connected together at one of their ends 31a along the axis. The opposite ends of the wire-like members are attached to a base 33 around the circumference of an opening 33a therethrough, the opening 33a having its center on the longitudinal axis and having a diameter greater than the maximum diameter of the mandrel 19 in FIG. 1 which is adapted to be inserted through the opening. The forward ends 31a of the wire-like members 31 are adapted to be held together by means of a small diameter tube 35 in which the ends 31a are inserted and then welded together within the tube. The forward end of the tube 35 is rounded in order to provide easy entry into the flexible tubular material T. As may be seen in FIG. 2 when the flexible tube T is pushed over the wire cage 30 the tube causes the wires of the cage, which are longer than the tube T, to converge and conform to the inner dimension of the hollow tube T. In one embodiment of the invention the flexible cage 30 was provided with 8 of the wire-like members 31 distributed around the cage base 33. The members 31 were made of 0.063" diameter music wire The forward ends of the wires 31 were confined within a stainless steel tube having a 0.313" O.D.

Figure 3:
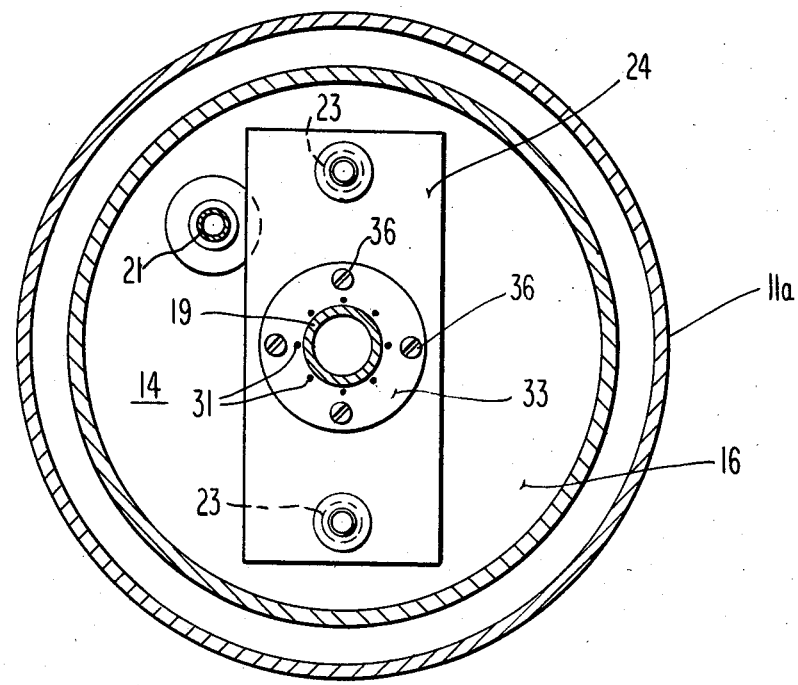
FIG. 3 is a cross-sectional view taken along the lines 3—3 in FIG. 1.
Figure 4:
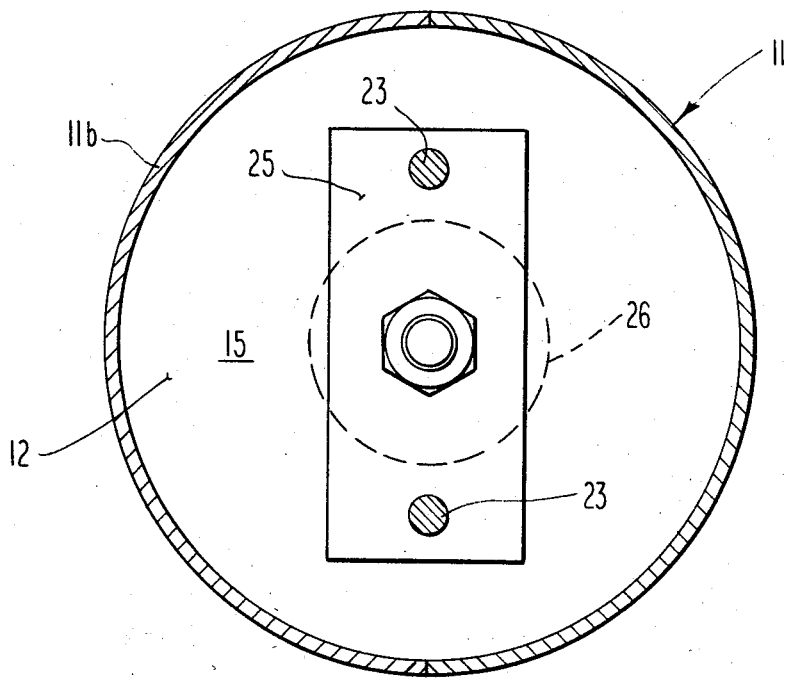
FIG. 4 is a cross-sectional view taken along the lines 4—4 in FIG. 1.

The base 33 is also provided with a plurality of openings 33b which are adapted to receive screws 36, FIGS. 1 and 3, for securing the flexible cage 30 to the forward end plate 24. The double acting cylinder 26 is adapted for actuation to move the rods 23, 23 and the forward end plate 24 which in turn supports the flexible cage 30 for movement into and out of the chamber 14 by way of the opening 13a in end plate 13. When the flexible cage 30 is within the chamber 14, as shown in FIG. 1, the opening 13a is closed by means of a cover or door 37.

Figure 2:
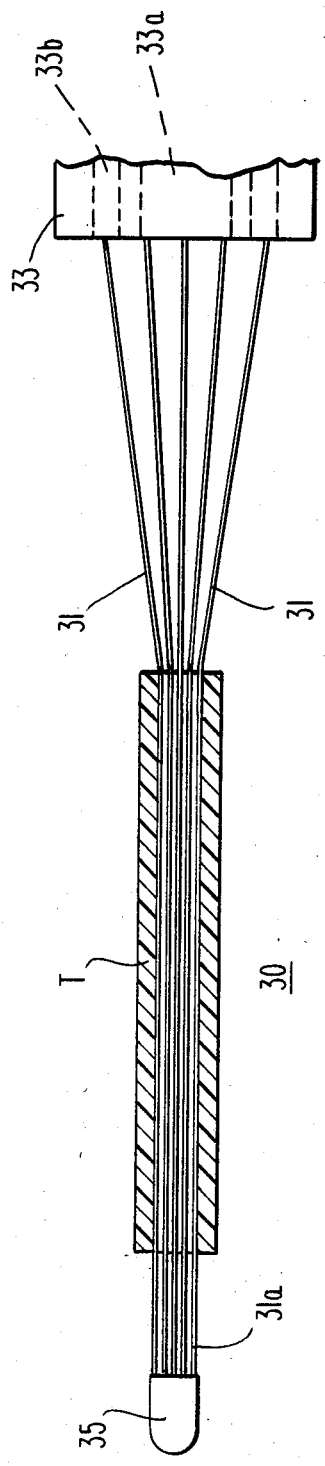
FIG. 2 is an elevational view of the flexible cage illustrated in FIG. 1 in unexpanded state and with a length of flexible tubing positioned on the longitudinal portion of the cage.

A typrcal operation of the process begins when the flexible cage 30 is extended out of the opening 13a in the forward plate 13 by means of the pneumatically operated cylinder 26 applying force to the plate 25, rods 23, 23 and forward plate 24. After the flexible cage 30 has moved to the forward or loading position outside of chamber 14 a flexible tubing member T is pushed over the flexible longitudinal portion of the cage 30 causing the wires 31 of the cage to converge and conform to the inner dimension of the hollow tube T. This is best seen in FIG. 2. After the flexible tube T has been positioned on the wire cage 30, the pneumatic cylinder 26 is actuated to withdraw the rods 23, 23 from the chamber 14 and move the flexible cage 30 into the chamber 14. The forward plate 24 carried by the rods 23, 23 pulls the cage 30 with the tubular member T over the mandrel 19 which expands the wire cage 30, causing the flexible tubing T to expand and conform to the outer dimensions of the expanded cage 30 as controlled by the outer dimensions or shape of the mandrel 19. When the cylinder 26 reaches its retracted end position the flexible cage 30 reaches the position on the mandrel 19 as shown in FIG. 1. At this time the door 37 is rotated about its support 37a and covers the opening 13a in the front end plate 13. The cooling media or cryogenic fluid is then injected through the fitting 20 into the interior of the mandrel 19 and out through the perforations 19a into the space between the expanded sleeve or tube T and the mandrel 19. The lance 21 is provided with holes and gaseous nitrogen shoots through the holes to circulate any liquid nitrogen that may accumulate in the bottom of chamber 14 to spray it around and add cooling to the chamber. The cryogenic fluid is at a temperature adequate to temporarily freeze the length of flexible tubing T in its expanded state while positioned on the flexible cage 30.

When the freezing cycle is completed, the supply of cooling media to the chamber 14 is turned off and the door 37 is opened to uncover the opening 13a to chamber 14. The pneumatic cylinder 26 is operated in reverse direction to push the flexible cage 30 with the expanded tubing T through the opening 13a and out of chamber 14. The expanded and frozen tube T then is removed from the cage 30 and a new flexible tube is pushed onto the wire cage 30 and the freezing cycle repeated. After the expanded and frozen length of flexible tubing T has been removed from the flexible cage 30 the tubing T then is slipped over the part to which it is to be secured. When the expanded length of flexible tubing T returns to normal temperature and to its original configuration it generates a tight pressure bond to the inserted part.

The cooling media or cryogenic fluid may be in the form of liquid nitrogen for freezing the flexible tubing T. After the liquid nitrogen has passed through the mandrel 19 and out the openings 19a it enters the surrounding area of the chamber 14 and is exhausted through the exhaust outlet 38 in FIG. 1. The forward section 11a of housing 11 in FIG. 1 is also provided with an inlet connection 39 for a nitrogen gas purge of the forward chamber 14. The rear section 11b of the housing 11 is provided with a fitting 40 for a warm nitrogen purge of the rear chamber 15 to prevent moisture penetration into this chamber.

From the foregoing it will be seen that the operation of the double acting cylinder 26 and the supply of cooling media to the apparatus 10 may be controlled by manually operated switches or automatically. By using a flexible cage and expanding mandrel as disclosed in the present application a relatively long length of flexible tubing can be expanded and its expanded shape can be closely controlled.

We claim:

1. Apparatus for securing a length of elastic flexible tubing having a predetermined internal diameter to a member having an external diameter larger than the predetermined internal diameter of the tubing comprising:
   a flexible cage having a longitudinal portion dimensioned to fit within the length of flexible tubing said flexible cage comprises a plurality of wire-like members distributed around a longitudinal axis and connected together at one of their ends along said axis, the opposite ends of said wire-like members being attached to a base around the circumference of an opening therethrough, said opening having its center on said longitudinal axis and having a diameter greater than the maximum diameter of said insertable means;
   means insertable into said longitudinal portion to expand the external diameter of said longitudinal portion to a diameter greater than the predetermined internal diameter of the flexible tubing;
   means for producing relative movement between said insertable means and said flexible cage to expand said longitudinal portion and the length of flexible tubing thereon to an expanded state so that the internal diameter of the length of flexible tubing is greater than external diameter of the member to which the length of flexible tubing is to be secured; and
   means for applying a cooling media to the length of flexible tubing at a temperature adequate to temporarily freeze the length of flexibletubing in an expanded state while positioned on said flexible cage and said insertable means.

2. Apparatus according to claim 1 wherein said insertable means comprises a mandrel adapted to be received within said flexible cage through said opening in said base and along said longitudinal axis, said mandrel being shaped to expand said longitudinal portion of said flexible cage comprising said plurality of wire-like members.

3. Apparatus according to claim 2 wherein said mandrel is mounted in a stationary position and said flexible cage is moved relative thereto.

4. Apparatus according to claim 3 including a housing having a chamber containing said mandrel and said flexible cage; an opening in said housing along said longitudinal axis; said flexible cage being movable into and out of said chamber through said opening along said longitudinal axis to move the length of flexible tubing into said chamber for expansion by said mandrel; and means for covering said opening in said housing while said cooling media is being applied to the length of said flexible tubing in the expanded state.

5. Apparatus according to claim 4 wherein said mandrel is hollow and has a plurality of perforations in the side wall thereof so that the cooling media is directed into the mandrel and out through said perforations to the space between the interior surface of the expanded length of flexible tubing and the exterior surface of said mandrel.

6. Apparatus according to claim 5 wherein said means for applying a cooling media to the length of flexible tubing includes means for connecting a source of the cooling media to the interior of said mandrel; and means for exhausting said cooling media from said chamber in said hbusing.

7. Apparatus according to claim 6 including means connected to said chamber of said housing for a cooling media purge of said chamber.

8. In an apparatus for securing a length of elastic flexible tubing having a predetermined internal diameter to a member having an external diameter larger than the predetermined internal diameter of the tubing the subcombination comprising:
   a flexible cage having a longitudinal portion dimensioned to fit within the length of flexible tubing and adapted to receive insertable means to expand the external diameter of said flexible cage along its longitudinal portion to a diameter greater than the predetermined interior diameter of the flexible tubing said flexible cage comprises a plurality of wire-like members distributed around a longitudinal axis and connected together at one of their ends along said axis, the opposite ends of said wire-like members being attached to a base around the circumference of an opening therethrough, said opening having its center on said longitudinal axis and having a diameter greater than the maximum diameter of said insertable means.

9. The sub-combination according to claim 8 wherein said plurality of wire-like members have a length longer than the length of flexible tubing.

10. A method for securing a length of elastic flexible tubing having a predetermined internal diameter to a member having an external diameter larger than the predetermined internal diameter of the tubing comprising the steps of:
   placing a length of flexible tubing on a flexible cage comprising longitudinal wire-like members secured together at their ends and having a longitudinal portion dimensioned to fit within the length of flexible tubing;
   inserting a mandrel into the flexible cage expand the longitudinal portion and the length of flexible tubing thereon to an expanded state so that the internal diameter of the length of flexible tubing is greater than the external diameter of the member to which the length of flexible tubing is to be secured;
   applying a cooling media to the interior of the length of flexible tubing at a temperature adequate to temporarily freeze the length of flexible tubing in the expanded state while positioned on the flexible cage;
   while said flexible tubing is in the expanded frozen state, removing the mandrel with respect to the interior of the flexible cage thereby permitting the flexible cage to return to its unexpanded condition and removing the expanded length of flexible tubing therefrom; and inserting the member into the expanded length of flexible tubing so that when the expanded and frozen length of flexible tubing returns to normal temperature and to its original configuration, the length of flexible tubing will generate a tight pressure bond to the inserted member.

11. A method for securing a length of elastic flexible tubing having a predetermined internal diameter to a member having an external diameter larger than the predetermined internal diameter of the tubing comprising the steps of:

placing a length of flexible tubing on a flexible cage comprising longitudinal wire-like members secured together at their ends and having a longitudinal portion dimensioned to fit within the length of flexible tubing;

moving the flexible cage into a chamber in a housing and over a mandrel to expand the longitudinal portion and the length of flexible tubing thereon to an expanded state so that the internal diameter of the length of flexible tubing is greater than the external diameter of the member to which the length of flexible tubing is to be secured;

sealing-.the chamber and applying a cooling media to the length of flexible tubing at a temperature adequate to temporarily freeze the length of flexible tubing in the expanded state while positioned on the flexible cage;

opening the chamber and removing the flexible cage from the mandrel and the chamber thereby permitting the flexible cage to return to its unexpanded condition with the expanded and frozen length of flexible tubing thereon;

removing the expanded and frozen length of flexible tubing from the flexible cage; and inserting the member into the expanded length of flexible tubing so that when the expanded and frozen length of flexible tubing returns to normal temperature and to its original configuration, the length of flexible tubing will generate a tight pressure bond to the inserted member.

12. Apparatus for securing a length of elastic flexible tubing having a predetermined internal diameter to a member having an external diameter larger than the predetermined internal diameter of the tubing comprising:

a housing having a chamber supporting a mandrel therein;

a flexible cage comprising longitudinal wire-like members secured together at their ends and having a longitudinal portion dimensioned to fit within the length of flexible tubing;

means for moving said flexible cage into said chamber and relative to the mandrel to expand said longitudinal portion of said flexible cage and the length of flexible tubing thereon to an expanded state so that the internal diameter of the length of flexible tubing is greater than the external diameter of the member to which the length of flexible tubing is to be secured; and means for applying a cooling media to the length of flexible tubing at a temperature adequate to temporarily freeze the length of flexible tubing in an expanded state while positioned on said flexible cage and mandrel.

* * * * *